Nov. 9, 1926.
G. Y. SAKAMOTO
1,606,102
AUTOMOBILE SIGNAL
Filed April 12, 1926
2 Sheets-Sheet 1
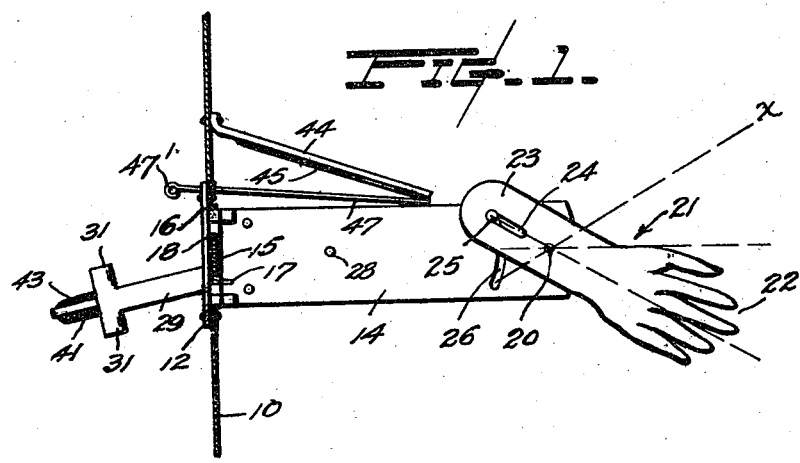
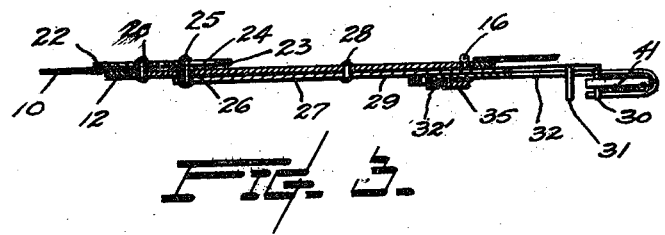
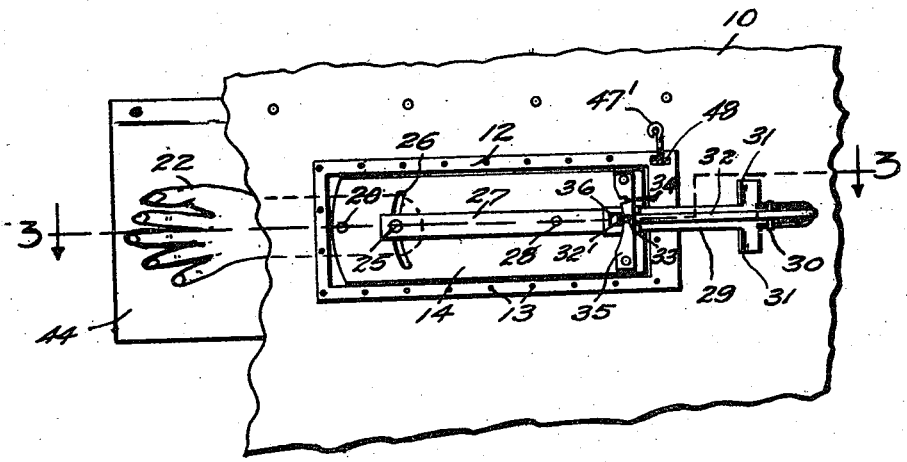
INVENTOR
George Y. Sakamoto
BY
Pierre Barnes
ATTORNEY Nov. 9, 1926.  
G. Y. SAKAMOTO  
AUTOMOBILE SIGNAL  
Filed April 12, 1926  
1,606,102  
2 Sheets-Sheet 2
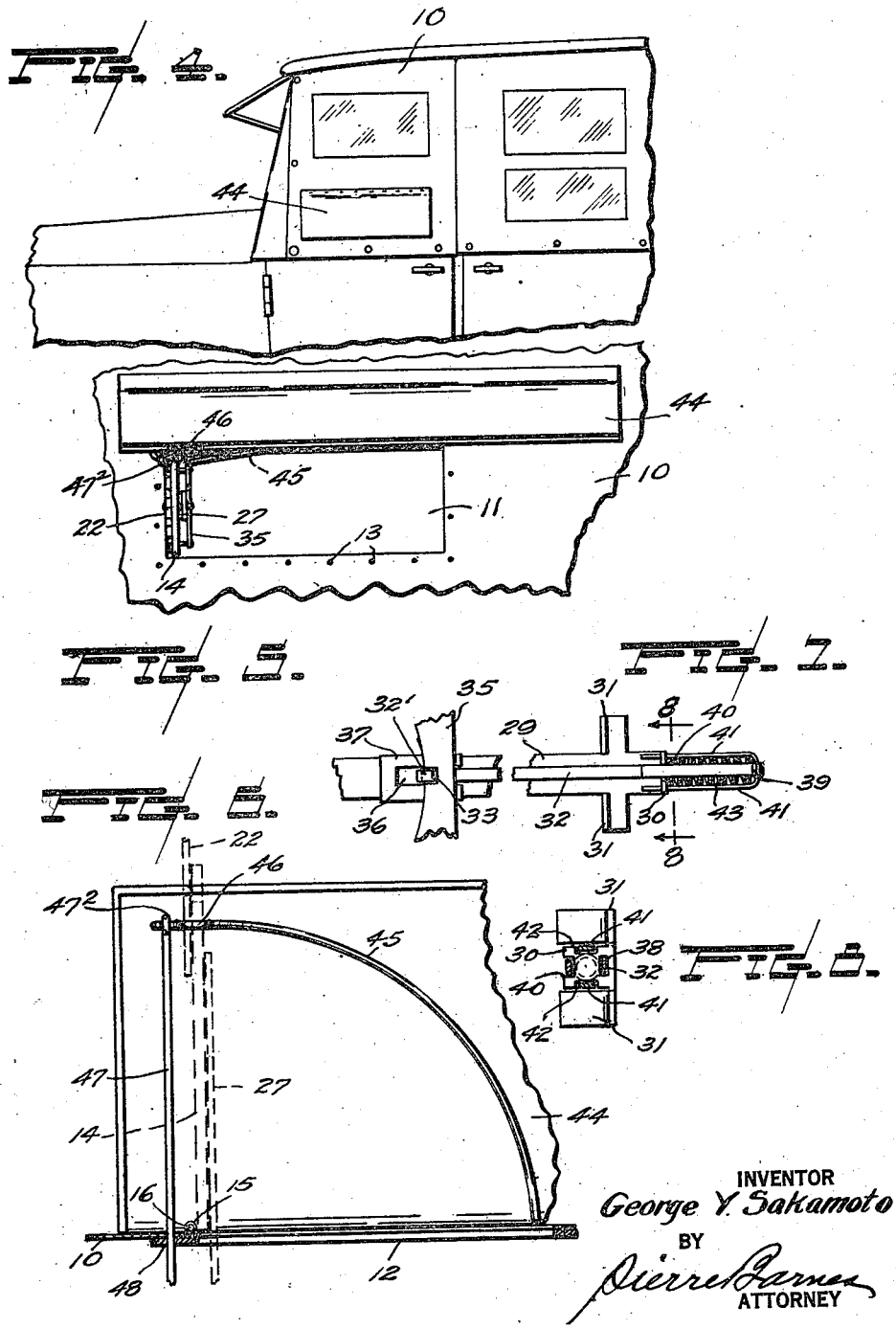
INVENTOR  
George Y. Sakamoto  
BY  
ATTORNEY Patented Nov. 9, 1926.

1,606,102

UNITED STATES PATENT OFFICE.

GEORGE Y. SAKAMOTO, OF SEATTLE, WASHINGTON.

AUTOMOBILE SIGNAL.

Application filed April 12, 1926. Serial No. 101,333.

This invention relates to direction and stop signaling devices for motor vehicles, its object, generally, being to provide a simple and inexpensively constructed device of this character which will be convenient to use and efficient in operation.

Another object is to provide a signaling device which is peculiarly adapted to be applied in the side of a closed car or in a side-curtain of an open car.

More specific objects and advantages of the invention will appear in the following description.

The invention consists in the novel construction, adaptation and combination of parts hereinafter described and claimed.

In the accompanying drawings,—

Figure 1 is a view partly in front elevation and partly in transverse vertical section of a direction signaling device shown applied to a side curtain of a touring car, the device being represented in operating position to denote the operator's intention to stop. Fig. 2 is an elevational view of the device as seen from the inside of a car, the curtain to which the device is secured being broken away. Fig. 3 is a horizontal sectional view on broken line 3—3 of Fig. 2. Fig. 4 is a side elevation of an automobile equipped with the present invention. Fig. 5 is a side elevation of a portion of a side curtain of the car shown in Fig. 4, with the device illustrated in its signaling position. Fig. 6 is an underside plan view of a portion of the shutter member shown in the position in which it is represented in Fig. 5. Fig. 7 is a fragmentary view of the operating lever and the latch devices therefor shown in elevation; and Fig. 8 is a sectional view on line 8—8 of Fig. 7.

In said drawings, the reference numeral 10 represents a curtain detachably connected as usual to an automobile at the left hand side of the driver's seat, not shown. Said curtain is provided with a horizontally disposed oblong aperture 11 surrounded at the inner surface of the curtain by means of a rectangular apertured frame 12 which is secured to the curtain as by means of rivets 13.

Hingedly connected to the frame 12, at the end toward the front of the car, is an oblong signaling member 14, hereinafter designated as the semaphore, adapted to be housed in the curtain and frame apertures, and within which the semaphore normally is yieldingly held by means of a spring 15 coiled about the hinge pin 16 and having its ends 17 and 18 bear against the semaphore and the frame, respectively.

Located at one side of said semaphore and connected intermediate its length by a pivot 20 to the free end of the semaphore is an indicating member 21 which, with the semaphore member 14, constitutes the signal device proper. The indicating member 21 has at one side of the pivot 20 a direction indicating element 22, herein shown in the similitude of a hand, and at the other side of said pivot is provided with an element 23, hereinafter designated as the wrist. Provided longitudinally in said wrist is a slot 24 within which engages the end of a stud 25 extending through an arcuate slot 26 of the semaphore from the arm 27 of an operating lever which is located at the opposite side of the semaphore from the indicating member.

Said operating lever is fulcrumed at 28 to the semaphore, the other arm 29 of the lever extending beyond the front end of the semaphore as illustrated in Fig. 2.

As shown, the lever arm 29 is formed or provided at its front end with a head 30 disposed at right angles to the plane of the lever and in proximity with said head, the arm 29 is provided with finger engaging projections 31, one at the top and the other at the bottom of the lever arm.

Mounted upon the lever arm 29 is a latch comprising a rod 32 having at one end a lug element $32^1$ which is engageable selectively in vertically spaced apart notches 33 and 34 of a guard 35 which is secured to the semaphore. The end of the latch rod in proximity of said guard is operable within a way 36 of an attachment 37 to the lever. The other end of the rod, as best shown in Figs. 7 and 8, passes through a guide slot 38 of the lever head 30 and thence bent back, as at 39, upon itself to have its extremity pass through a second guide slot 40 of the head. Secured at the bend 39 to said rod is a U-shaped piece disposed in right angular relation with the axis of the rod to have the side legs 41 of the piece parallel with the rod and extend through guide slots 42 of the head. The end of the rod protruding beyond the head and said U-shaped piece constitute a cage for a helical spring 43 which, acting against the lever head, tends to retain the latch in engageable relation with a selected notch 33 or 34 of the guard 35.

Normally the latch is engaged in the guard notch 33 thereby retaining the longitudinal axes of operating lever 27—29 and the indicating member 21 in a horizontal plane. By releasing the latch from the notch 33 and pushing the lever arm 29 downwardly the indicating member is caused to have the direction indicating element 22 turned downwardly as represented in Fig. 1. By swinging the lever arm 29 upwardly, to have the latch engage in the guard notch 34, the indicating element 22 will be directed upwardly as represented diagrammatically by the dash line X in Fig. 1.

The operating lever also serves as a handle, so to speak, for swinging the semaphore and the indicating member horizontally from its housed position in the curtain and frame outwardly into signaling position at right angles to the car as represented in Fig. 5.

In manipulating the operating lever to swing the signaling devices outwardly from the car, the operator engages the lever projections 31 with his fingers and with his thumb bearing against the end of the cage element of the latch rod to control the action of the spring 43.

44 represents a shutter connected as by means of rivets along its upper edge to the curtain 10 and above the aperture 11 to serve as a closure therefor, said shutter being of greater length than the aperture to serve as a cover or blind, with respect to the outside of the car, for the entire signaling device when in its unemployed position as represented in Fig. 2. The shutter thus hingedly connected along its upper edge to the curtain 10 is swung outwardly and upwardly by the semaphore when the latter is swung horizontally outward by means of the operating lever 27—29.

In practice, the shutter 44 has secured thereto a reinforcing rod 45 which serves as a wearing rail which bears against the upper edge of the semaphore when the semaphore is being swung outwardly from the car. The track-rail 45 extends in a general direction oblique with respect to the shutter and preferably curved as shown in Fig. 6. Near the free end of the shutter, said track-rail is formed to provide a notch 46 within which the semaphore engages when it reaches a position at right angles to the car, whereupon the notch engagement of the shutter with the semaphore holds the latter in its operating position.

47 is a lever rod extending through a hole 48 in the frame 12 has one of its ends connected, as at $47^2$, to the track-rail. Said lever rod is utilized to disengage the shutter from the semaphore by pushing downwardly the lever-rod end $47^1$, the lever-rod fulcruming in the frame, causing the lever rod to effect the elevation of the shutter. When the shutter is thus raised to free the semaphore, the spring 15 acts to swing the semaphore into the housing therefor and carry the outer end of the indicating member against the curtain 10.

After or during the closing movement of the signaling devices with respect to the car, the operator lets go the lever-rod 47, permitting gravitation to bring the shutter into its closed position as represented in Fig. 4.

The construction and operation of the invention will, it is thought, be understood from the foregoing description; it being understood that the movement of the signaling devices, both the semaphore 14 and the indicating member 21 are actuated and controlled by means of the operating lever 27—29. The shutter is raised by the outward movement of the signaling devices into position to automatically secure them in such extended position. When the shutter is disengaged from the semaphore, the spring 15 and gravitation, respectively, act to restore the signaling devices and the shutter into their closed relations with respect to the car.

The above described signaling devices may be folded up with the curtain and put away therewith when weather conditions permit the driver of the car to use his arm and hand for signaling.

While I have explained the invention as applied to a curtain, I do not wish to be understood as limiting myself thereto, as it may also be used advantageously in the side of a closed car.

Furthermore, I do not confine myself specifically to the construction of the invention as disclosed in the illustrated embodiment, as changes in proportion, sizes, and arrangement of parts may be made therefrom within the scope of the following claims.

What I claim, is,—

1. In a signaling device of the character described, a frame adapted to be secured to an automobile, signaling means comprising a semaphore member hingedly connected to said frame for movement in a horizontal plane, and a direction-indicating member pivotally connected to the semaphore member for movement in a vertical plane, and an operating means carried by the semaphore member and connected to the direction-indicating member whereby said members are regulated selectively in their respective planes of movement.

2. In a signaling device as defined in claim 1 wherein automatically acting means rendered operable by movement of the semaphore member is employed to secure the latter in its signaling position, and a manually controlled means to effect the disengagement of the semaphore.

3. In a signaling device of the character described, a frame adapted to be secured to an automobile body, a semaphore member hingedly connected to said frame for horizontal swinging movement into and from the frame, a direction-indicating member pivotally connected to the free end of the semaphore member for movement in a plane at right angles to the plane of movement of the semaphore member, an operating lever pivotally connected to both of said members, a guard provided with notches, said guard being secured to the semaphore member, and a spring actuated latch carried by said operating lever and engageable in selected of said notches for securing the direction-indicating member in predetermined angular positions with respect to the semaphore member.

4. In a signaling device of the character described, a frame, a shutter therefor, signaling means comprising two members connected together for relative angular movement, one of said members being hingedly connected to said frame, manually actuated means carried by one of said members for regulating the movement of both of the members in unison from the frame and the relative angular relation of the members with respect to each other, said means also acting through the medium of one of said members to effect the opening movement of said shutter with respect to the frame, a catch provided upon said shutter for retaining the members in their extended position with respect to the frame, manually controlled means for releasing the members from said catch, and a spring for returning the members to the frame when they are disengaged from the catch.

5. In a signaling device of the character described, a frame adapted to be secured to a side curtain of an automobile, signaling means comprising a member hingedly connected to the frame and a second member pivotally connected to the first named member for movement in a plane at right angles to the movement of said first named member, a spring acting to yieldingly retain the first and second named members, respectively, in said frame and against the curtain, and operating means carried by the first named member for controlling the movements of both of the members.

Signed at Seattle, Washington, this 4th day of March 1926.

GEORGE Y. SAKAMOTO.